(12) United States Patent
Meyer-Blumenroth et al.

(10) Patent No.: US 9,095,820 B2
(45) Date of Patent: Aug. 4, 2015

(54) FILTRATION SYSTEM HAVING FLUID COUPLINGS

(75) Inventors: Ulrich Meyer-Blumenroth, Idstein-Woersdorf (DE); Reinhard Voigt, Gotha (DE)

(73) Assignee: MN Beteiligungs GmbH, Wiesbaden (DE)

( * ) Notice: Subject to any disclaimer, the term of this patent is extended or adjusted under 35 U.S.C. 154(b) by 219 days.

(21) Appl. No.: 13/055,962

(22) PCT Filed: Jul. 29, 2009

(86) PCT No.: PCT/EP2009/005472
§ 371 (c)(1),
(2), (4) Date: Jan. 26, 2011

(87) PCT Pub. No.: WO2010/015346
PCT Pub. Date: Feb. 11, 2010

(65) Prior Publication Data
US 2011/0127206 A1    Jun. 2, 2011

(30) Foreign Application Priority Data

Aug. 4, 2008    (DE) .................. 10 2008 036 096

(51) Int. Cl.
| | |
|---|---|
| *B01D 63/00* | (2006.01) |
| *B01D 53/22* | (2006.01) |
| *F16L 3/00* | (2006.01) |
| *B01D 63/12* | (2006.01) |
| *B01D 63/04* | (2006.01) |
| *B01D 63/08* | (2006.01) |
| *F16L 17/02* | (2006.01) |
| *F16L 19/02* | (2006.01) |

(52) U.S. Cl.
CPC .............. *B01D 63/12* (2013.01); *B01D 63/043* (2013.01); *B01D 63/08* (2013.01); *B01D 53/22* (2013.01); *B01D 2313/02* (2013.01); *B01D 2313/21* (2013.01); *B01D 2319/02* (2013.01); *F16L 17/02* (2013.01); *F16L 19/02* (2013.01)

(58) Field of Classification Search
None
See application file for complete search history.

(56) References Cited

U.S. PATENT DOCUMENTS

| | | | |
|---|---|---|---|
| 4,293,419 A | 10/1981 | Sekino et al. | |
| 4,517,085 A * | 5/1985 | Driscoll et al. ............... | 210/232 |
| 5,037,547 A * | 8/1991 | Burrows ....................... | 210/232 |
| 5,267,957 A * | 12/1993 | Kriesel et al. .................. | 604/85 |
| 5,304,312 A | 4/1994 | Forster et al. | |

(Continued)

FOREIGN PATENT DOCUMENTS

| | | |
|---|---|---|
| DE | 2 213 165 | 6/2002 |
| EP | 0 925 825 A2 | 6/1999 |
| EP | 1 256 372 A2 | 11/2002 |
| JP | 2001 224931 A | 8/2001 |
| JP | 2004 275822 A | 10/2004 |
| WO | 03/037489 A1 | 5/2003 |

*Primary Examiner* — Nam Nguyen
*Assistant Examiner* — Richard Gurtowski
(74) *Attorney, Agent, or Firm* — ProPat, L.L.C.

(57) ABSTRACT

The invention relates to a filtration system that includes one or more flat filter, capillary tube filter, or wound filter modules having a single or double permeate drain on the edge side and fluid couplings for connecting the filter modules to a fluid distributor or additional filter modules. The fluid couplings include at least one passage each for permeate fluid, raw fluid, and concentrate fluid.

18 Claims, 12 Drawing Sheets

(56) References Cited

U.S. PATENT DOCUMENTS 6,302,448 B1 * 10/2001 Van Der Meer et al. . 285/123.15
6,461,513 B1 * 10/2002 Jen ................................ 210/650
2002/0060191 A1 * 5/2002 Sutton et al. .................. 210/741
2005/0035047 A1 * 2/2005 Colby et al. ............. 210/321.74
2005/0061766 A1 * 3/2005 Jochem ......................... 215/305
2007/0131605 A1 6/2007 Watari et al.

* cited by examiner

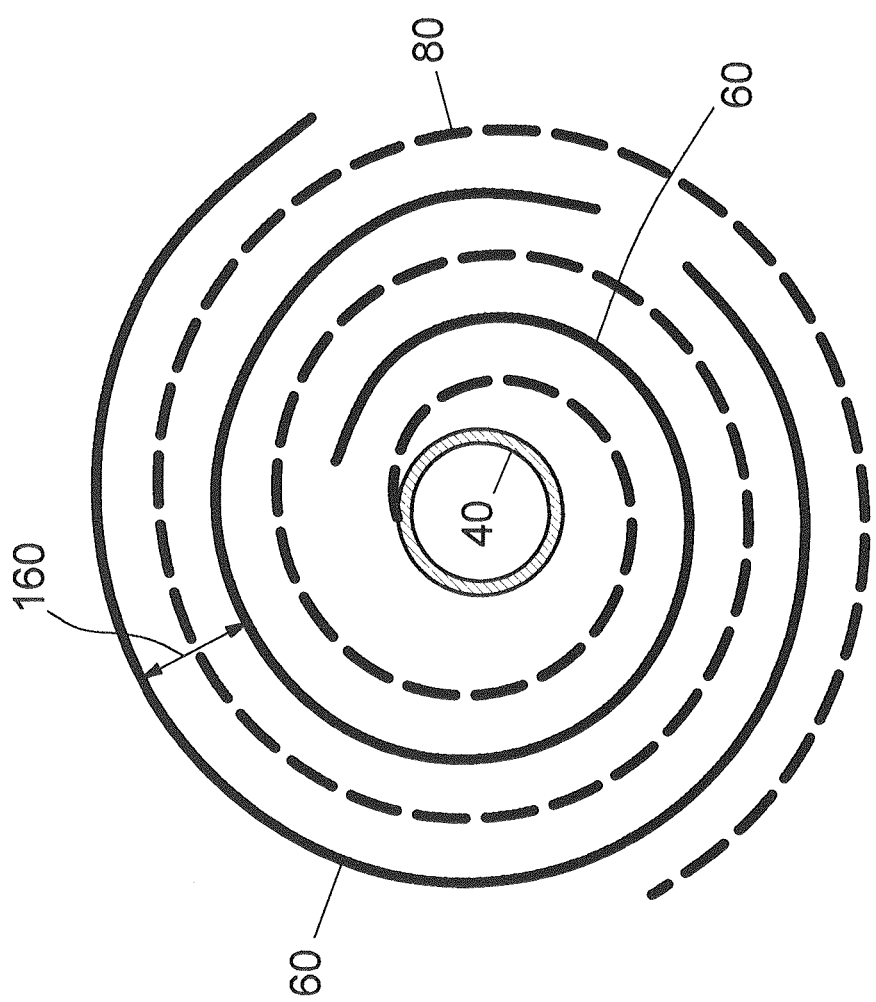

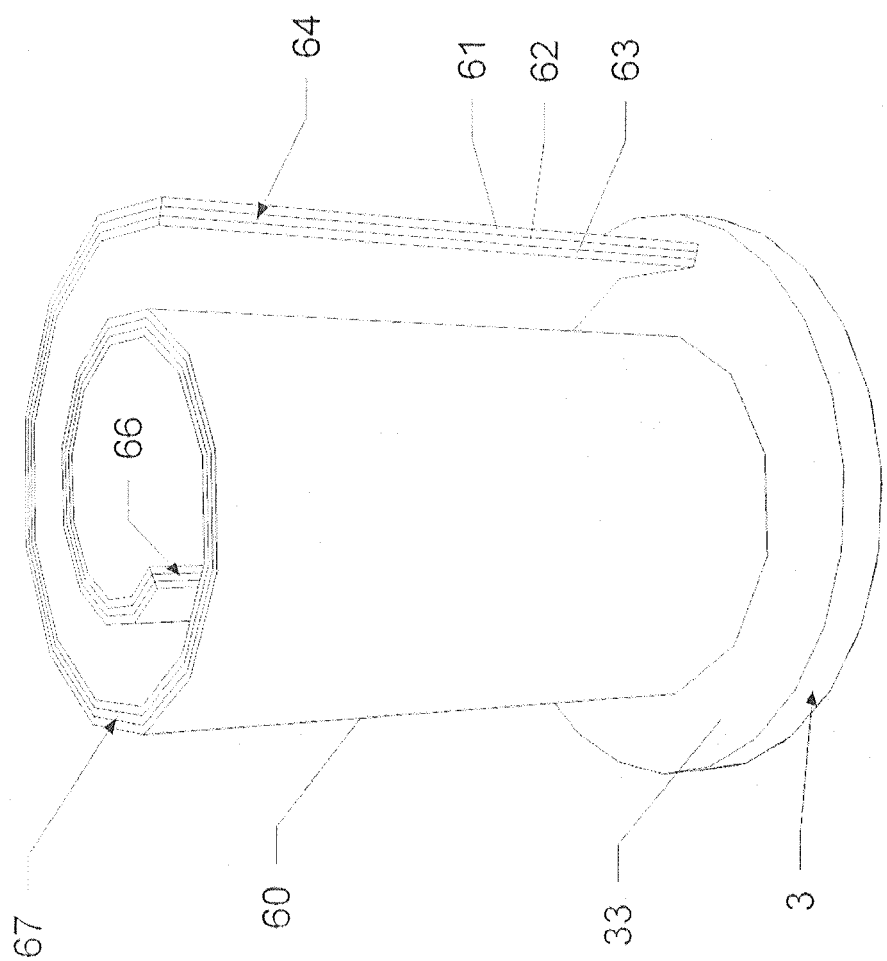

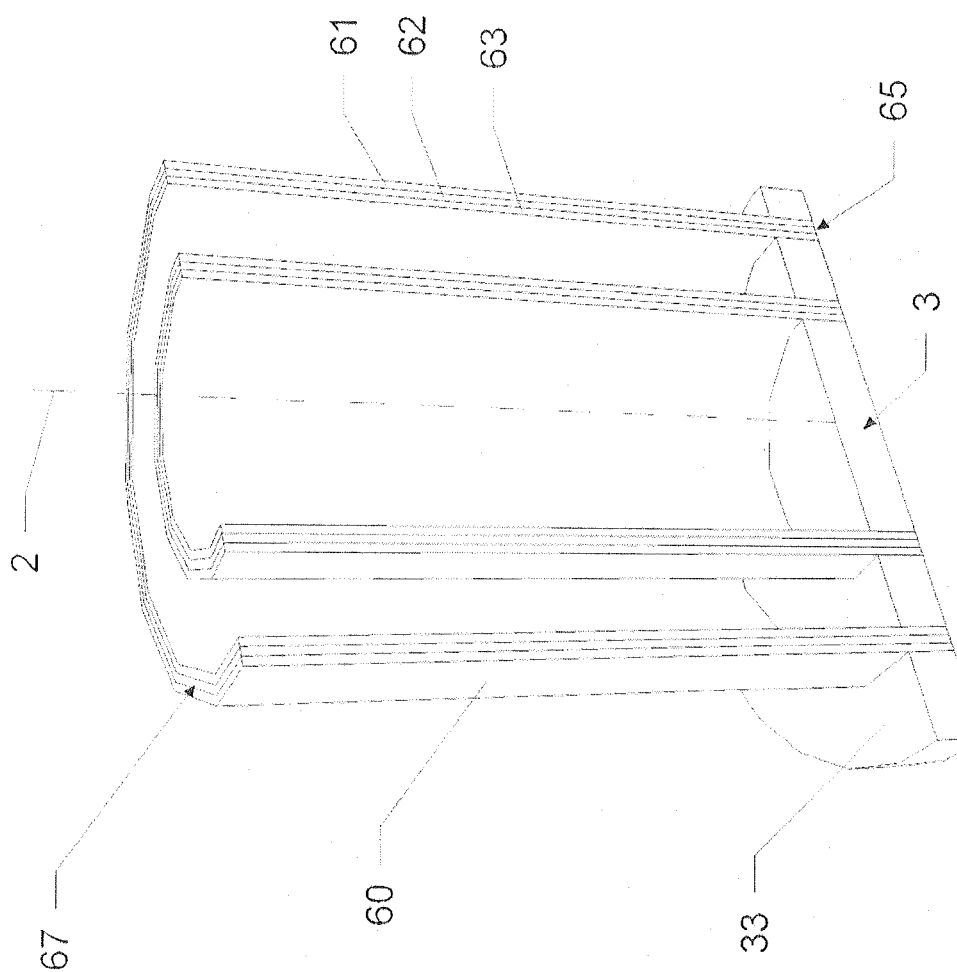

FILTRATION SYSTEM HAVING FLUID COUPLINGS

CROSS-REFERENCE TO RELATED APPLICATIONS

This application is being filed under Rule 1.371 as a National Stage Application of pending International Application No. PCT/EP2009/005472 filed Jul. 29, 2009, which claims priority to the following parent application: German Patent Application No. 10 2008 036 096.1, filed Aug. 4, 2008. Both International Application No. PCT/EP2009/005472 and German Patent Application No. 10 2008 036 096.1 are hereby incorporated by reference herein in their entirety.

FIELD OF THE INVENTION

The present invention relates to a filtration system which comprises one or more flat filter, capillary tube filter or wound filter modules with a permeate drain at the edges and fluid couplings for connecting the filter modules to a fluid distributor or to further filter modules.

BACKGROUND OF THE INVENTION

Many of the known filtration systems having flat filters, which are used, for example, for wastewater cleaning, contain filter modules with a tubular or box-shaped housing which is open at the top and bottom and in which a plurality of flat filter elements are arranged parallel to one another. The gaps between the filter elements form passages through which the flow can pass. The filter elements are embodied as pockets or cassettes in which a flexible or rigid drainage element is surrounded on both sides by a support nonwoven coated with a filter membrane—and referred to below as a membrane nonwoven. Each filter element has openings which are arranged centrally or at the edges and via which said filter element is connected to a pipe system for evacuation of the permeate fluid passing through the filter membrane. The drainage element serves as a spacer and shaping support for the membrane nonwovens and for conducting away the permeate to the openings and for evacuation thereof. The flow resistance of the drainage element influences the distribution of pressure in the interior of the filter element and, in association therewith, the efficiency of the filter.

WO 03/037489A1 (whose United States equivalent is United States Patent Publication No. 2005/000881A1) describes a filter module for cleaning wastewater, with a plurality of filter membrane pockets which have at least one opening for draining the interior thereof and are arranged vertically, parallel and preferably at the same distance from one another in a rigid holder in such a manner that a liquid can flow intensively through the gaps located between adjacent filter membrane pockets.

DE 2 213 165 discloses a filter in which the filter cartridge consists of a multi-layered cloth which is wound spirally and has two opposite, spiral end surfaces. The layers forming the cloth are sealed in such a manner that the fluid entering the filter cartridge through a spiral end surface has to flow through at least one filter surface before being able to leave the filter cartridge again. Each filter layer is located between two thin spacer layers having a high pore volume. At least one fluid-impermeable layer is placed against the surface of one of the spacer layers. By means of the use of a thin spacer layer, a compact filter cartridge having a large active filter surface per unit of volume is obtained.

U.S. Pat. No. 5,304,312 describes a sealed filter unit with a first and second end cap on the end sides, wherein the end caps have connectors for the connection of lines for an untreated liquid to be filtered and for a permeate filtered out of said untreated liquid. The filter unit contains a filter element which is arranged between the end caps and consists of a spirally wound, two-layered filter composite material which comprises a filter layer and a liquid-impermeable spacer layer. At the two opposite end sides of the spirally wound filter composite material, the edges of the filter layer are each connected in a liquid tight manner to the spacer layer adjacent on the left and right. This construction ensures that the untreated liquid supplied via the first end cap has to permeate the filter layer first in order to be removed as permeate at the second end cap.

EP 1 256 372 A2 (whose United States equivalent is United States Patent Publication No. 2002/168,491A1) teaches a filter module which comprises a capillary filter mat wound spirally around a perforated pipe. An untreated fluid to be filtered is supplied through the perforated pipe and brought into contact with the spirally wound capillary filter mat. By means of a pressure differential between the inside and outside of the capillary filters, a permeate is filtered out of the untreated fluid and removed from the interior of the capillary filters. Access to the interior of the capillary filters is provided by the two end sides of the spirally wound capillary filter mat being provided with end caps made of a castable, curable material and the end caps obtained being cut to size substantially perpendicularly to the longitudinal axis of the capillary filters.

During constant operating conditions, such as trans-membrane differential pressure, solids content and flow velocity of the untreated fluid, the capacity of a filtration system, i.e. the volume of untreated fluid filtered per hour, is proportional to the active filtration surface. Due to the production-induced limitations and to the limited mechanical load-bearing capacity of industrially manufactured filter membranes, the size of the active filtration surface of conventional filter modules upward is limited. Therefore, in order to construct filtration systems having a high filtration capacity, a large number of filter modules are connected to one another in a type of parallel connection by means of a pipeline system. Pipeline systems of this type which customarily have a multiplicity of branches and pipe couplings are costly to produce, complicated to install and increase the space required by the filtration system without contributing to the filtration capacity.

SUMMARY OF ADVANTAGEOUS EMBODIMENTS OF THE INVENTION

Accordingly, it is the object of the present invention to provide a filtration system having simple and effective fluid conduction. Furthermore, the invention is intended to make it possible to connect a multiplicity of filter modules to form a filtration system with a high filtration capacity without the use of a complicated pipeline system.

This object is achieved by a filtration system, comprising
one or more filter modules and
one or more fluid couplings for coupling the filter modules to a fluid distributor and optionally for coupling said filter modules to further filter modules, wherein
the filter modules are configured as flat filter, capillary tube filter or wound filter modules with single or double permeate outlet openings at the edges;
the fluid couplings have at least one duct for permeate fluid, and
the duct for permeate fluid is connected to the permeate outlet openings.

Developments of the invention are distinguished in that the fluid coupling
- has at least one duct for untreated fluid, which is isolated in a fluidtight manner from the duct for permeate fluid;
- has at least one duct for concentrate fluid, which is isolated in a fluidtight manner from the duct for permeate fluid;
- has at least one duct for untreated fluid and at least one duct for concentrate fluid, which ducts are each isolated in a fluidtight manner from the duct for permeate fluid;
- comprises a coupling body which is of single-piece, two-piece or three-piece design;
- comprises a coupling body which is of single-piece design and has at least one permeate reservoir, the permeate reservoir being connected to the duct for permeate fluid and to the permeate outlet openings of the filter module;
- comprises a coupling body which is of single-piece design and has at least one permeate reservoir and at least one concentrate reservoir, the permeate reservoir being connected to the duct for permeate fluid and to the permeate outlet openings of the filter modules, and the concentrate reservoir being connected to the duct for concentrate fluid; and
- comprises seals, the seals preferably being annularly closed.

The filter modules are distinguished in particular in that they
- comprise one or two end walls, with at least one end wall having permeate outlet openings; and preferably
- at least one end wall is provided with one or more ducts for permeate fluid;
- at least one end wall has one or more ducts for untreated fluid;
- at least one end wall has one or more ducts for concentrate fluid; or
- at least one end wall has in each case one or more ducts for permeate fluid, untreated fluid and concentrate fluid.

In another development of the invention, the filter modules comprise a housing which is preferably of tubular configuration.

In a particularly preferred embodiment, the filter modules comprise one or more conduits for permeate fluid, the conduits running substantially parallel to the filtration surfaces and connecting the two end sides of the filter modules.

Further refinements of the filtration system according to the invention are reproduced in claims 17-19.

BRIEF DESCRIPTION OF THE FIGURES

The invention is explained in more detail below with reference to figures, in which, in a schematic illustration:

FIG. 5 shows a cross section of a preferred wound filter module having spirally wound flat filter elements with spacers located in-between; and FIGS. 6a-d show perspective sectional views of wound filter modules.

DETAILED DESCRIPTION OF ADVANTAGEOUS EMBODIMENTS OF THE INVENTION

Figure 1:
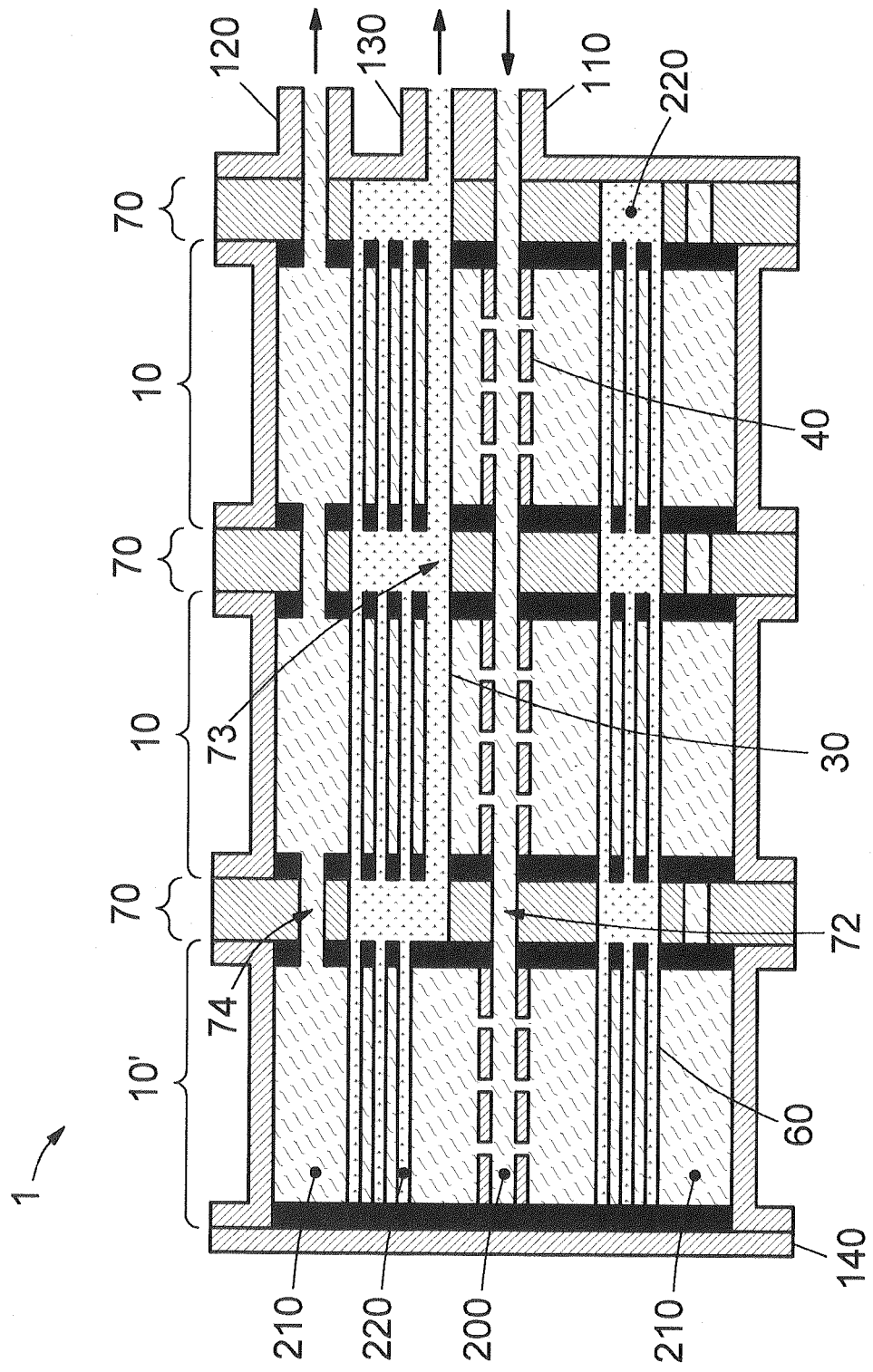
FIG. 1 shows a filtration system with three filter modules connected by fluid couplings.

FIG. 1 shows an example of a filtration system 1 according to the invention to which an untreated fluid 200 to be filtered is supplied via a line 110. The untreated fluid 200 flows through three filter modules (10', 10, 10), with a permeate fluid 220 being filtered out of the untreated fluid 200 and being removed via a line 130. Materials which cannot pass through the filtration membranes of the filter modules (10', 10, 10) are concentrated in the untreated fluid 200. After flowing through the filter modules (10', 10, 10), the untreated fluid 200 is therefore also referred to as a concentrate fluid 210. The concentrate fluid 210 is removed via a line 120. The untreated fluid 200 and the concentrate fluid 210 are not separated from each other here. On the contrary, during the continuous filtration operation, a concentration gradient arises between the untreated fluid 200 and the concentrate fluid 210. The filter modules (10', 10, 10) are configured as flat filter, capillary tube filter or wound filter modules having a single or double permeate drain at the edges and comprise one or more filter elements 60. The filter elements 60 are designed as planar or spirally wound flat filters or cylindrical capillary tube filters. Multi-layered stacks of filter membranes and woven spacer fabrics or filter pockets or cassettes, as known in the prior art, are suitable as the flat filters. The stacks or filter pockets are sealed in a fluidtight manner at least two opposite edges.

The filter modules (10', 10, 10) are connected to one another and to the lines (110, 120, 130) in a fluidtight manner by means of fluid couplings 70 such that the interior of the filter elements 60 is closed off—apart from trans-membrane permeation—from the untreated and concentrate fluids (200, 210).

In a preferred embodiment of the invention, the filter modules 10 (optionally also the filter module 10') are equipped with conduits 30 for permeate fluid 220. The inside diameter of the conduits 30 is dimensioned in such a manner that the permeate fluid 210 collected in the interior of the filter elements 60 can be removed from the filter modules (10', 10, 10) in a manner virtually free from resistance.

The fluid couplings 70 shown in FIG. 1 have one or more ducts 72 for untreated fluid 200, one or more ducts 73 for permeate fluid 220 and one or more ducts 74 for untreated fluid 210.

Figure 2A:
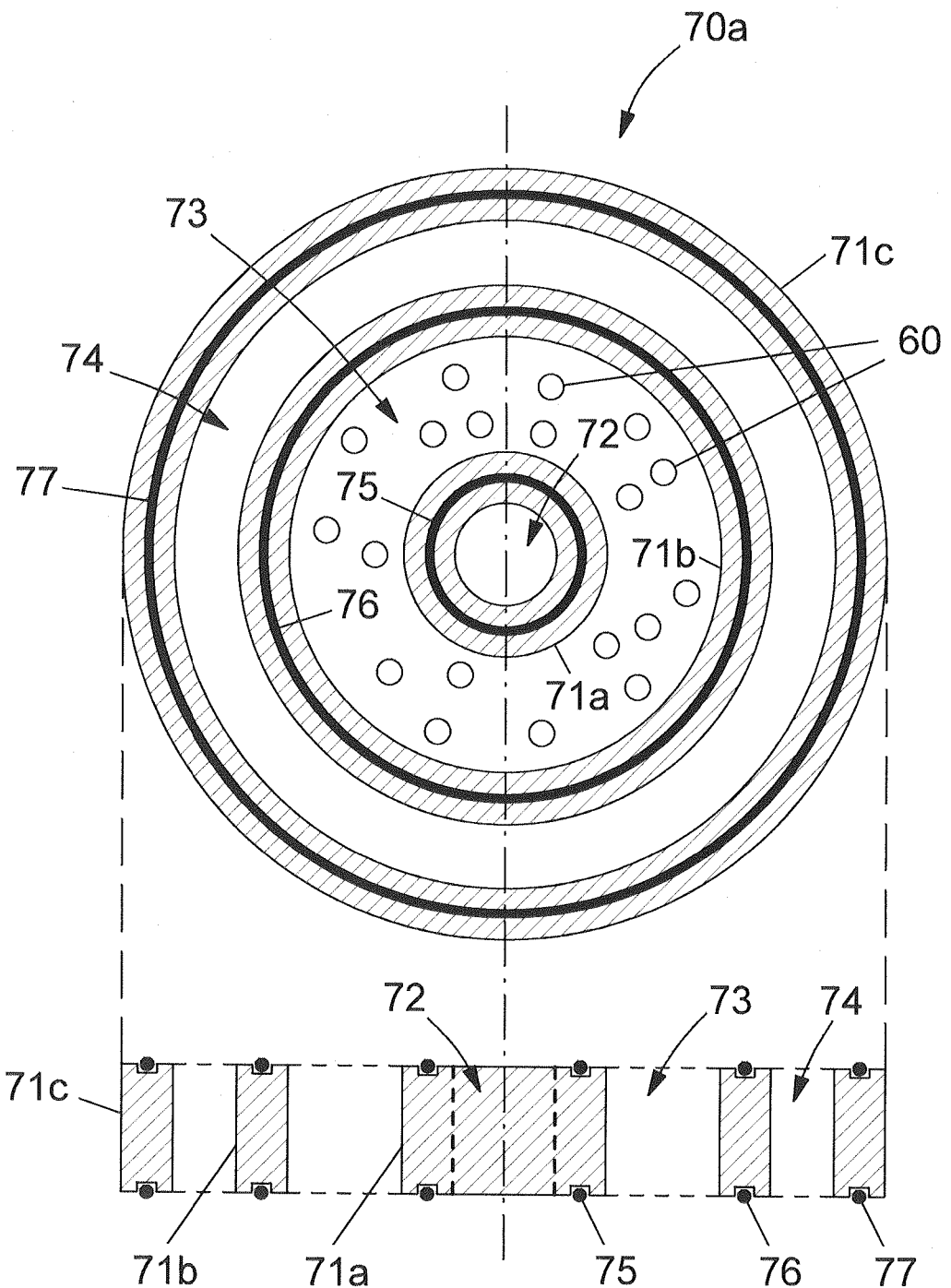
FIGS. 2a-c show fluid couplings having coupling bodies which are of single-piece and three-piece design.

FIG. 2a shows, in top view and cross section, a cylindrical fluid coupling 70a according to the invention, the fluid coupling comprising a three-piece coupling body (71a, 71b, 71c) made of three concentrically arranged rings of graduated size. The cylindrical space region enclosed by the inner ring 71a forms a duct 72 for untreated fluid 200. The space region enclosed by the inner ring 71a and central ring 71b forms a duct 73 for permeate fluid 220. A further duct 74 for concentrate fluid 210 is enclosed by the central ring 71b and the outer ring 71c. The ducts (72, 73, 74) are sealed off from one another by means of in each case two annular seals (75, 76, 77) arranged on opposite end sides of the rings (71a, 71b, 71c). In order to illustrate the function of the fluid coupling 70a, the cross sections and the openings on the end sides of capillary tube filter elements 60 are illustrated in FIG. 2a. The capillary tube filter elements 60 are arranged in the filter modules (10', 10, 10) in such a manner that the openings on the end sides thereof are connected to the duct 73 for permeate fluid 220 and form a line system through which permeate fluid 220 flows.

Figure 2B:
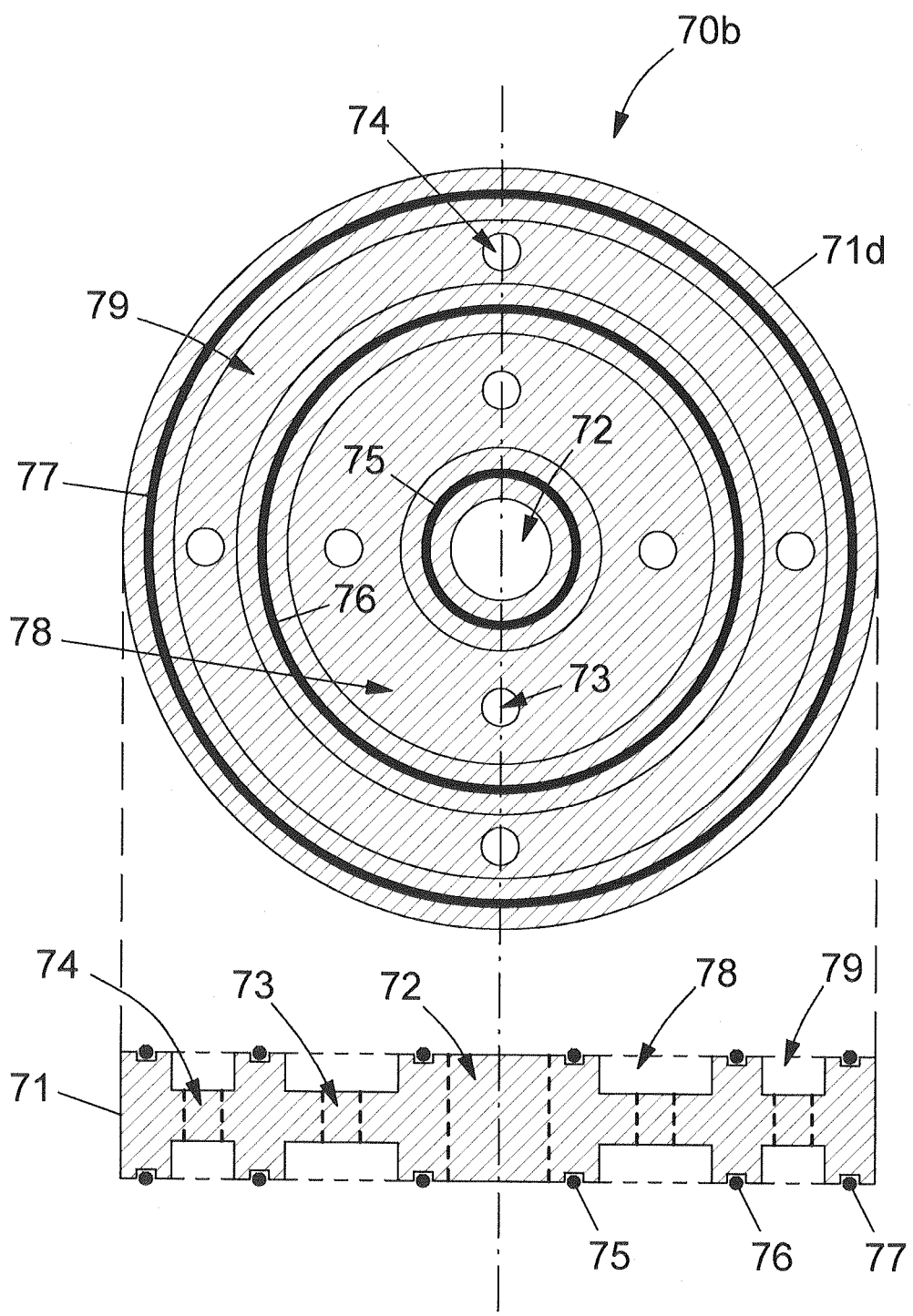

A further fluid coupling 70b which is preferred according to the invention is illustrated in FIG. 2b. The fluid coupling 70b comprises a coupling body 71d which is of single-piece design and has ducts (72, 73, 74) for untreated fluid 200, permeate fluid 220 and concentrate fluid 210. In order to conduct away permeate fluid 220 from the filter modules (10', 10, 10) and in order to connect four ducts 73 for permeate fluid 220, the coupling body 71d is equipped with a distributor chamber in the form of an annularly encircling recess. A further distributor chamber 79 likewise embodied in the form of an annularly encircling recess connects four ducts 74 for concentrate fluid 210. The ducts (72, 73, 74) are sealed off from one another by means of in each case two annular seals (75, 76, 77) arranged on opposite end sides of the coupling body 71d.

Figure 2C:
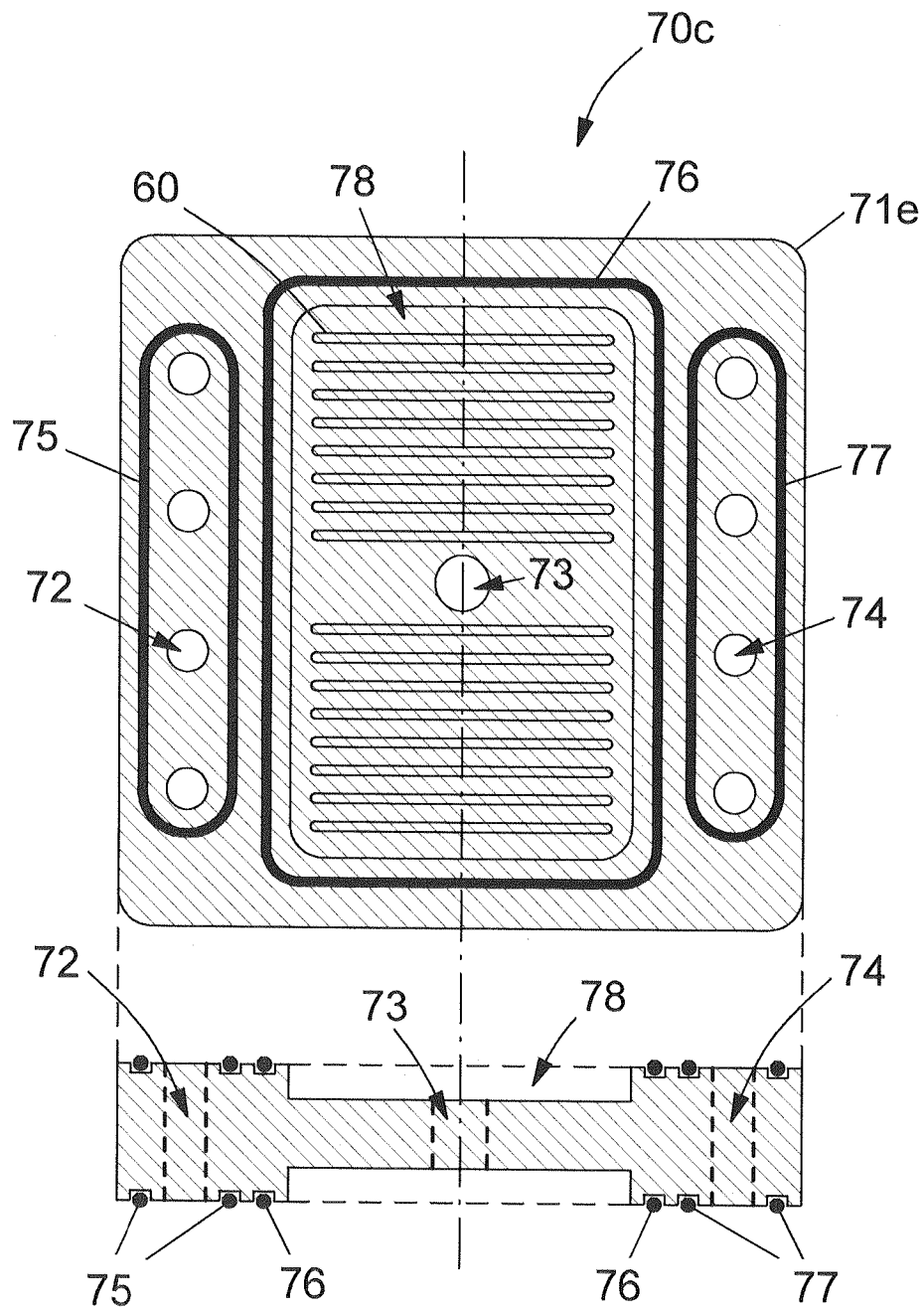

The fluid couplings 70a and 70b shown in FIGS. 2a and 2b are suitable for filter modules (10', 10, 10) having a cylindrical cross section, in particular for wound filter modules and for capillary tube filter modules, in which the tube openings of the capillary tube filter are arranged about a central axis in an annular region which is preferably congruent to the distributor chamber 78. A fluid coupling of the type shown in FIG. 2c is suitable for flat filter modules with plane filter elements 60. A fluid coupling 70c comprises a single-piece coupling body 71e. The other reference numbers have the same meaning as in FIG. 2b. In addition, the cross sections of plane filter elements 60 are illustrated in the top view of the fluid coupling 70c. Four ducts 72 and 74 in each case serve to conduct untreated fluid 200 and concentrate fluid 210 further.

Figure 3A:
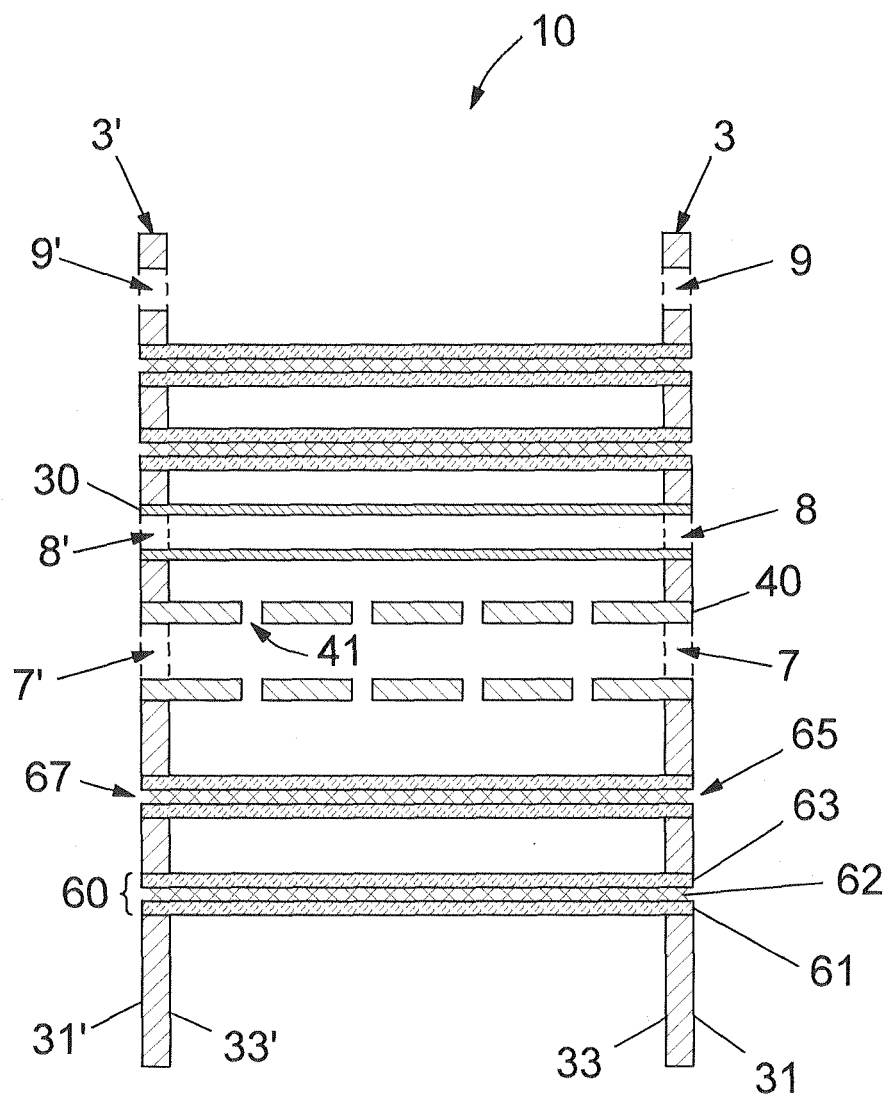
FIGS. 3a-b show sectional views of filter modules.

The coupling bodies 71a to 71e are preferably composed of a basic material to which additives are optionally added. The basic material is selected from the group comprising polymers, such as polypropylene, polyvinyl chloride and the like; thermoplastics, glass-fiber-reinforced plastics, resins, rubber of natural or synthetic origin, and mixtures of the abovementioned materials. Glass or carbon fibers are preferably used as the additive. The coupling bodies 71a to 71e are produced in different ways, for example by means of injection molding, optionally followed by mechanical machining, or by mechanical machining of blanks. As an alternative thereto, the coupling bodies 71a to 71e are produced by layerwise lamination of suitably shaped or punched flat materials. FIG. 3a shows a filter module 10 with filter elements 60 in cross section. The filter element 60 are configured as planar or spirally wound flat filters or as capillary tube filters. The filter elements 60 illustrated in FIG. 3a is, for example, a flat filter with two filter membranes (61, 63) and drainage element 62 located in-between, or a capillary tube filter, wherein the reference numbers 61 and 63 refer to opposite sectional surfaces of the capillary tube wall and the drainage element 62 is entirely omitted. The filter module 10 comprises two end walls 3 and 3' with outsides 31 and 31'. Open edge regions or permeate outlet openings 65 and 67 of the filter element 60 open at the outsides 31 and 31'. The end walls (3, 3') preferably have ducts (7, 7') for untreated fluid 200, ducts (8, 8') for permeate fluid 220 and ducts (9, 9') for concentrate fluid 210, wherein the ducts (8, 8') are connected in a fluidtight manner by a permeate line 30. The permeate line 30, which is arranged substantially parallel to the longitudinal axis or parallel to the membrane surfaces of the filter elements 60, permits permeate fluid 220 to be conducted away through a plurality of interconnected filter modules 10 in a manner virtually free from resistance. The permeate line 30 forms a passage, which is virtually free from resistance, for permeate fluid 220 which enters the interior of the filter elements 60 through the membranes and the flow of which is obstructed by the drainage element 62 arranged in the interior or by the small internal cross section of capillary tube filters. The ducts (7, 7') are preferably connected by an untreated fluid line 40 which has outlet openings 41 in the wall thereof. The untreated fluid 200 supplied to the filtration system 1 is distributed uniformly into the filter modules 10 by the untreated fluid line 40.

Figure 3B:
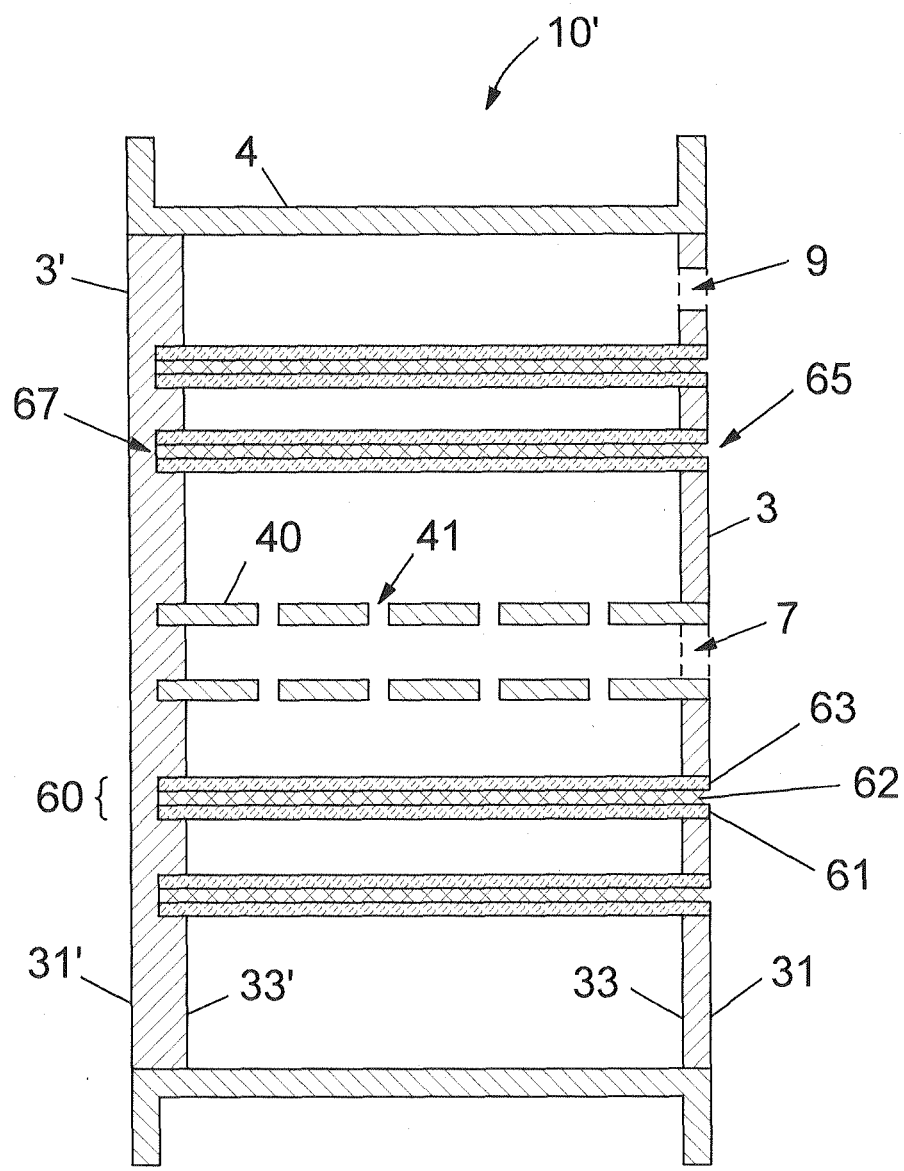

FIG. 3b illustrates a filter module 10' having single permeate outlet openings 65 at the edge. In the filter module 10', edge regions or permeate outlet openings 67 of the filter elements 60 are enclosed in a fluidtight manner by an end wall 3'. Permeate fluid 220 is conducted out of the filter elements 60 only via open edge regions or permeate outlet openings 65 in an end wall 3. The other reference numbers have the same meaning as in FIG. 3a. In addition, the filter module 10' illustrated in FIG. 3b is equipped with a housing 4. The housing 4 is connected to the end walls 3 and 3' in a fluidtight manner. The filter module 10 illustrated in FIG. 3a can be provided with a housing 4 in the same manner as the filter module 10' (however, the housing 4 has not been shown in order to keep FIG. 3a clear).

Figure 4:
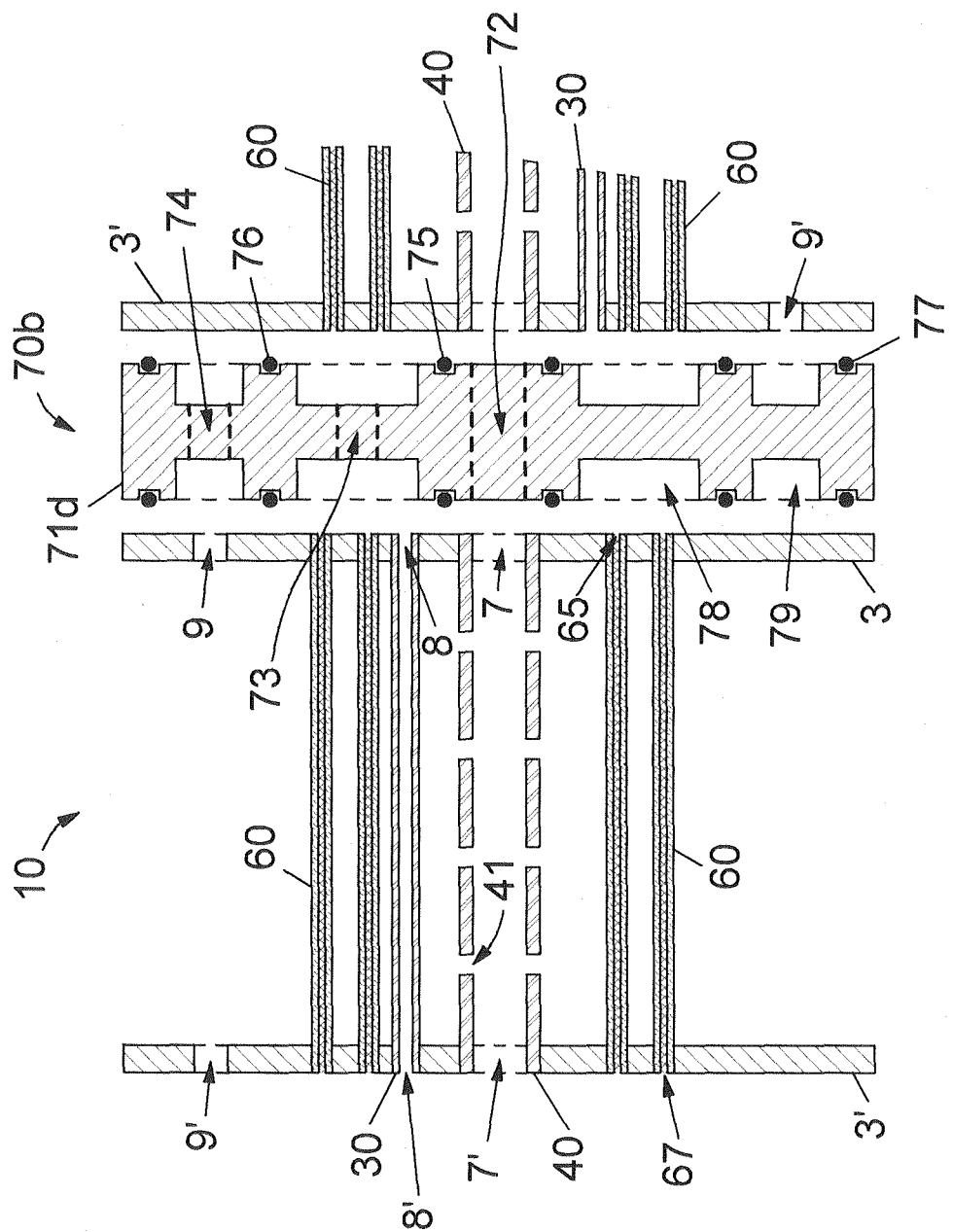
FIG. 4 shows a sectional view of two filter modules which are connected by means of a fluid coupling.

FIG. 4 shows, in an exploded illustration, a sectional view of the connection between two filter modules 10 by means of a fluid coupling 70b, where the reference numbers have the same meaning as in FIGS. 2b and 3a. Untreated fluid flows through the ducts (7, 7') in the end walls (3, 3') of the filter modules 10 and through the duct 72 of the coupling body 71d. Permeate fluid filtered out of the untreated fluid flows out of the interior of the filter elements 60 through permeate outlet openings (65, 67) in the end walls (3, 3') into the permeate reservoir 78 of the coupling body 71d and is conducted further through the permeate line 30 communicating with the permeate reservoir 78 via ducts (8, 8'). The connection via the permeate reservoir 78 means that the permeate line 30 and the ducts (8, 8') do not need to be brought into overlap with the duct 73. This is apparent from FIG. 4 in which the permeate line of the filter module, which is only partially illustrated on the right side of the figure, is arranged at the bottom and the permeate line 30 of the filter module 10, which is fully depicted on the left side, is arranged at the top. The permeate lines 30 of the two filter modules communicate via the permeate reservoir 78 and the duct 73. The same applies to the conducting away of the concentrate fluid, wherein the passage 9 in the end wall 3 of the filter module 10 depicted on the left in FIG. 4 communicates with the passage 9' in the end wall 3' of the filter module depicted on the right, via the concentrate reservoir 79 and the duct 74.

A particularly preferred embodiment of the filtration system 1 according to the invention, the embodiment comprising a novel wound filter module not hitherto known in the prior art, is described below. Reference is made here in particular to FIG. 5 and FIGS. 6a to 6d. In the novel wound filter module, the filter membranes (61, 63) are preferably each laminated to one of the two sides of the drainage layer 62. In particular, the filter elements 60 are manufactured from a ribbon-shaped, preferably flexible filter composite material which is laminated in a virtually continuously operated laminator from two ribbon-shaped filter membranes and a ribbon-shaped drainage layer by means of liquid adhesive or solid ribbon-shaped adhesive means, such as adhesive nets or adhesive films. In order to produce the ribbon-shaped filter composite material, for example, a first ribbon-shaped filter membrane, a first ribbon-shaped adhesive net of thermoplastic polymer, a ribbon-shaped drainage layer, a second ribbon-shaped adhesive net of thermoplastic polymer and a second ribbon-shaped filtration membrane are each supplied from a separate stock reservoir reel and combined in a pressure roll couple to form a ribbon-shaped stack, the ribbon-shaped stack is heated at its top and bottom sides in a heated roll couple and subsequently cooled such that the first and second adhesive nets melt and subsequently cool, causing the drainage layer to become durably adhesion bonded to the filter membranes.

The drainage layer is composed of a polymer, inorganic or metallic ribbon material which has an open structure to conduct fluids through. The material of the drainage layer is preferably a lattice or spacer net made of plastic. Spacer nets known in the prior art consist of first and second sheetlike loop structures and a system of pile threads arranged between said first and second loop structures. The pile threads are spaced orderly relative to one another and in the warp or weft direction of the loop structures, each pile thread passing alternatingly through loops of the first and second loop structures such that the pile thread has a sawtooth or spiral course.

The filter membrane is constructed of one or more layers, preferably two layers. Customary two-layer filter membranes consist of a support nonwoven and of a porous membrane layer. During the production of filter composite material, the support nonwoven is bonded or laminated to the drainage layer such that the porous membrane layer is arranged on the outside of the filter composite material. The porous membrane layer is bonded to the support nonwoven by wet coagulation or lamination. In wet coagulation, the porous membrane layer is deposited on the support nonwoven; otherwise, it is laminated onto the support nonwoven. The porous membrane layer preferably consists of polyether sulfone, polysulfone, polyacrylonitrile, polyvinylidene fluoride, polyamide, polyetherimide, cellulose acetate, regenerated cellulose, polyolefin or fluoropolymer. The porous membrane layer is for example produced by a nonwoven or woven fabric being coated with polymer solution and the polymer being precipitated out in a subsequent phase inversion step. Alternatively thereto, a polymer sheet is suitably stretched to produce pores in the polymer sheet. The stretched polymer sheet is then laminated onto a support nonwoven for mechanical stabilization. Filter membranes produced by these methods are commercially available, for example as NADIR® membranes (MICRODYN-NADIR GmbH, Wiesbaden) or Celgard® flat sheet membranes (Celgard Inc., Charlotte, N.C., USA).

In order to produce the filter elements 60, filter blanks having a suitable, preferably rectangular shape, are cut out, for example, from a filter composite material of the above-described type. The filter blanks obtained are sealed in a fluidtight manner at the edges by means of known methods, such as, for example bonding the drainage layer to the filtration membranes by thermal or ultrasonic welding;
adhering, wherein, in an edge region of the filter blank, a liquid adhesive is introduced between the drainage layer and the filter membranes and cured/crosslinked;
dip cementing, wherein an edge region of the filter blank has an adhesive applied to it on the top and bottom sides and also on the cut face/abutting edge;
machine stitching with a thread; or
by means of a mechanical clamping device.

In this case, at least two mutually opposite edge regions, preferably three or four edge regions of the filter blanks, are sealed in a liquid tight manner over their entire length.

The preferably rectangular filter elements 60 thus obtained have a first and second edge region (64, 66) sealed in a fluidtight manner and a third and fourth open (i.e. unsealed) or sealed edge region (65, 67).

One or more filter elements 60 stacked on one another are wound to form a cylindrical spiral body and are fixed in said shape by suitable mechanical holding devices, such as, for example, bands or rings. An exemplary wound arrangement is illustrated in FIG. 5. The flat filter elements 60 are preferably wound around a distributor pipe 40 for untreated fluid. In a development of the invention, one or more spacer elements 80 which are of sheetlike design and through which the flow can pass are added to the single-layer or multi-layer stack of flat filter elements 60 prior to the spiral body being wound (see FIG. 5). Said spacer elements 80 are, for example, wide-meshed lattices or nets made of plastic. One spacer element 80 is preferably inserted in each case between two flat filter elements 60.

In a particularly preferred embodiment of the invention, one or more, preferably tubular permeate lines 30 are added to the winding arrangement or the spiral body. The permeate lines 30 are arranged between two adjacent flat filter elements 60 or between a flat filter element 60 and a spacer element 80 in such a manner that the longitudinal axis thereof is oriented substantially parallel to the longitudinal axis of the winding arrangement. The length of the permeate lines 30 corresponds here to the length of the wound arrangement, i.e. to the width of the flat filter element 60.

The spiral body which is fixed by means of holding devices and with the optional distributor pipe 40 and the optional permeate lines 30 is provided with a first end wall 3 by being cast on the end side with a liquefied, curable material and the material subsequently being cured, with the first end wall 3 enclosing the third edges 65 in a fluidtight manner. In order to produce the first end wall 3, for example, a casting mold having a rectangular or circular inner cross section and a plane base is filled to a predetermined height with epoxy resin. In order to reinforce the end wall 3, it is expedient to add glass or carbon fibers to the epoxy resin. Subsequently thereto, the spiral body is oriented relative to the casting mold in such a manner that the first edge region 65 is fully immersed in the epoxy resin. The epoxy resin is then cured thermally or by means of UV light to form a preform which encloses the first edge region 65 in a fluidtight manner. The preform is removed from the casting mold and is mechanically machined by means of sawing, milling, turning or grinding machines in order to provide the first end wall 3 with a precisely defined final shape and in order to expose and to open the edge region 65 on the outside 31 of the end wall 3, thus producing access through which a flow can pass to the interior of the flat filter element 60, i.e. to the drainage layer 62. In the same manner, the optional distributor pipe 40 and the optional permeate lines 30 are opened by mechanical machining. In addition thereto, if required, drilling or milling is carried out in order to remove resin from the interior of the distributor pipe 40 and the permeate lines 30. In a development of the invention, a duct 9 for concentrate fluid is drilled into the end wall 3. The wound filter module is preferably provided with a second end wall 3', wherein the second end wall 3' is manufactured in the same manner as the first end wall 3, for example by casting with a liquefied, curable material and subsequent mechanical machining.

Owing to the three-layered construction thereof consisting of two filter membranes (61, 63) and the drainage layer 62 located in-between, the flat filter elements 60 are robust and withstand a trans-membrane differential pressure between the outside of the filter membranes (61, 63) and the drainage layer 62 of greater than 2 bar, preferably greater than 10 bar, and particularly preferably greater than 20 bar without mechanical damage or leaks forming. According to the invention, the flat filter elements 60 have a length of 0.1 to 6.0 m, preferably of 0.4 to 4.0 m, and particularly preferably of 0.6 to 2.5 m, in the direction of the axis 2. The space region which is filled with the spirally wound flat filter elements 60 has a radial dimension of 0.05 to 1.5 m, preferably of 0.1 to 1.25 m, and particularly preferably of 0.2 to 0.8 m, with respect to the axis 2 as the central axis of the spiral winding. In this case, the radial distance (referred to in FIG. 5 by the reference number 160) between the outside of the spirally wound flat filter elements 60 and the inside, which is adjacent to the outside, of the same or further flat filter elements 60 is 0.1 to 20 mm, preferably 0.3 to 8 mm, and particularly preferably 0.5 to 3 mm. The spirally wound filter module 1 having the abovementioned dimensions has an active filtration surface of greater than 50 m², preferably greater than 250 m² and particularly preferably of greater than 1000 m² per filter module.

FIG. 5 shows schematically the cross section of a preferred filter winding with the distributor pipe 40 and two spirally wound flat filter elements 60 and a spacer element 80 arranged between the flat filter elements 60. The spacer element 80 is preferably configured as a wide-meshed lattice or net of plastic. The radial distance between the outside of the spirally wound flat filter elements 60 and the inside, which is adjacent to the outside, of the same or further flat filter elements 60 is referred to by a double arrow 160. The radial distance 160 is 0.1 to 20 mm, preferably 0.3 to 8 mm, and particularly preferably 0.5 to 3 mm.

Figure 6C:
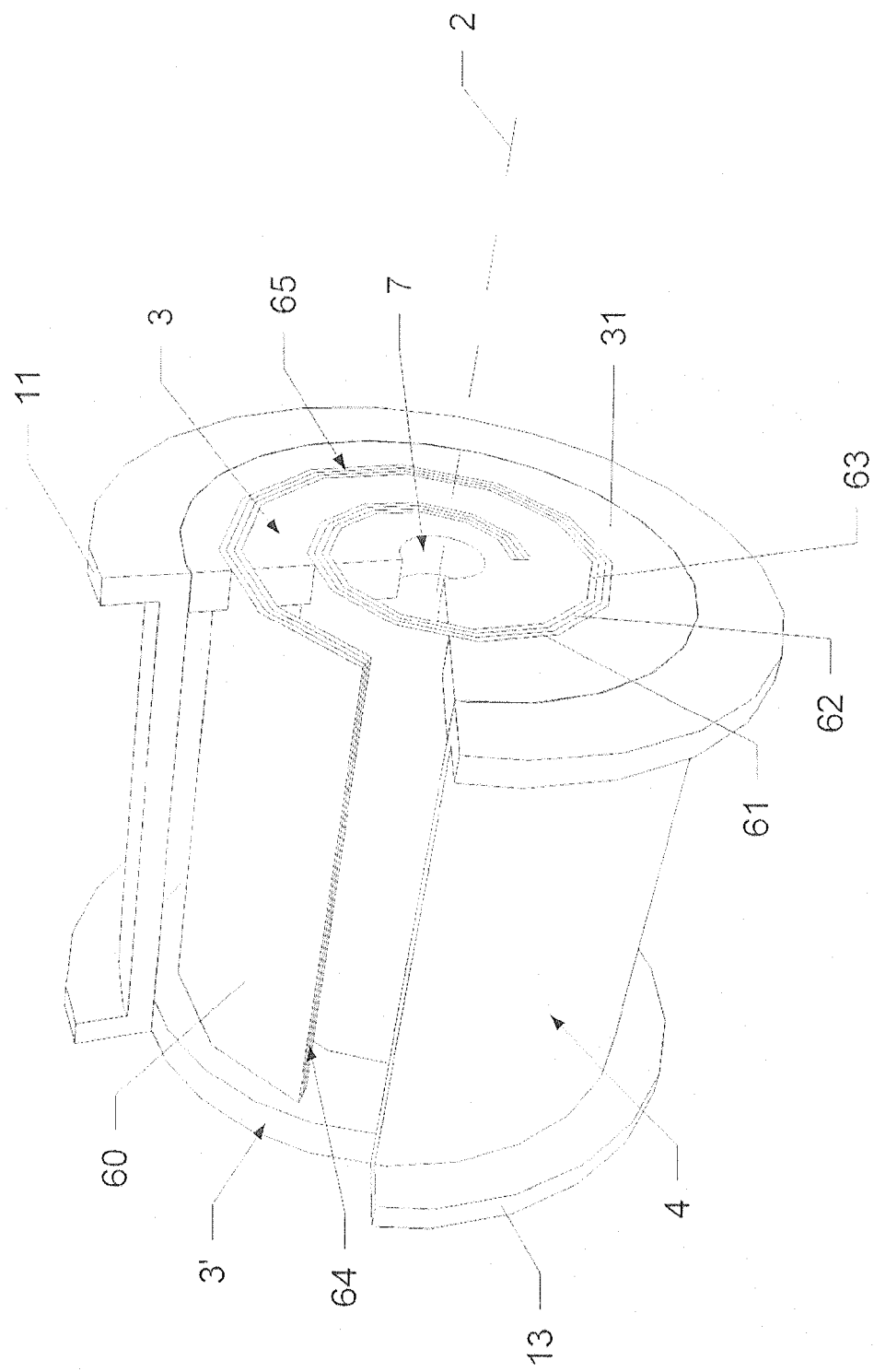

FIG. 6c shows a perspective, partially sectioned view of the preferred wound filter module with two end walls (3, 3') and a housing 4, wherein the edges of the end walls (3, 3') are connected to the housing 4 in a fluidtight manner. The end walls (3, 3') are expediently provided with centrally arranged ducts (7, 7') for the conduction through of an untreated fluid to be filtered. The housing 4 is preferably of tubular configuration. In an expedient development, the housing 4 is provided on the end sides with flanges (11, 13) which make it possible to connect the wound filter module in a simple manner to further filter modules or to other components of a filtration system. The wound filter module withstands an internal pressure of greater than 2 bar, preferably greater than 10 bar, and particularly preferably greater than 20 bar without mechanical damage or leaks forming.

Figure 6D:
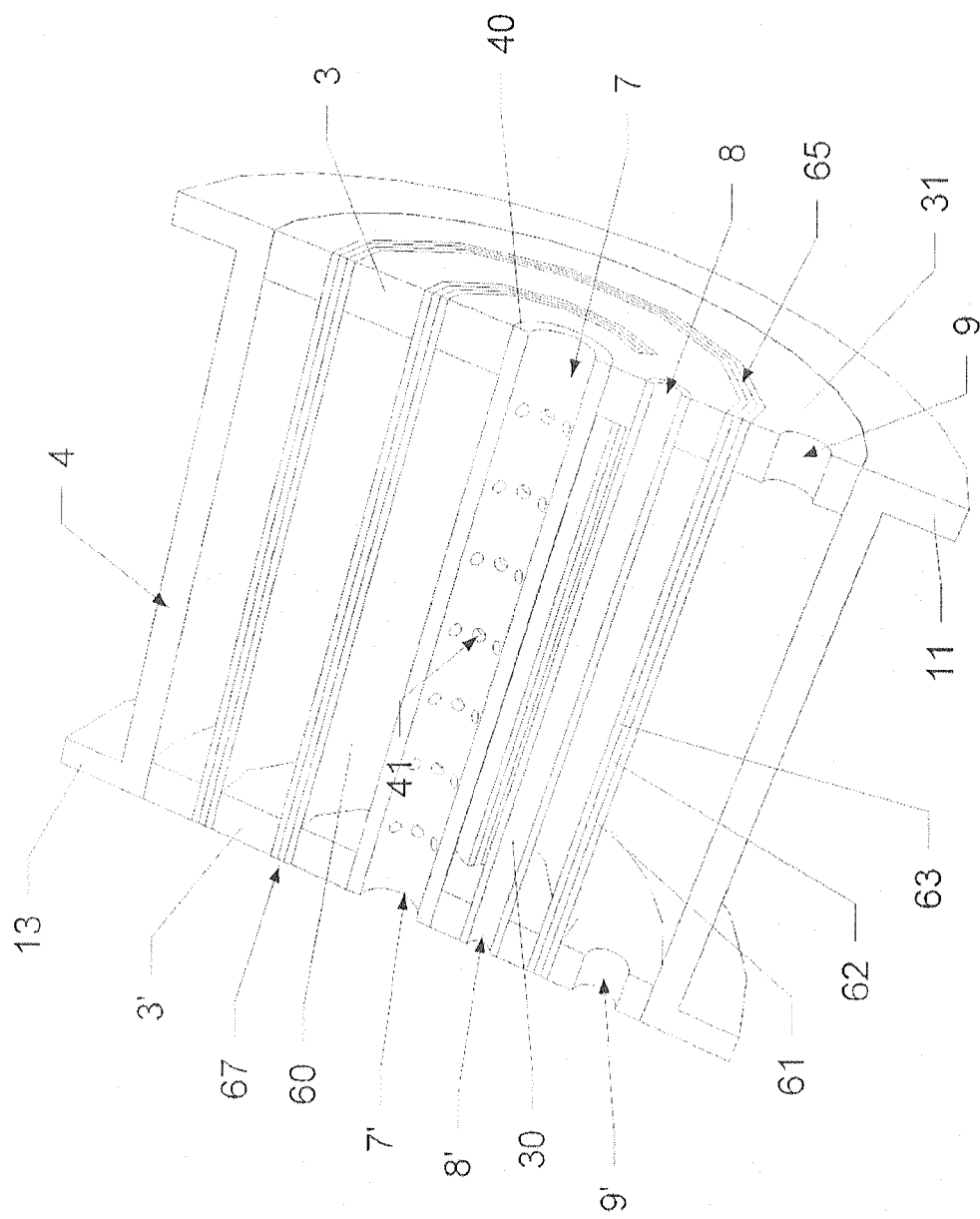

FIG. 6d shows the preferred wound filter module with two end walls (3, 3') and a centrally arranged distributor pipe 40 which connects the ducts (7, 7') in the end walls (3, 3'). The wall of the distributor pipe 40 has one or more openings 41 through which the untreated fluid flows outward in the radial direction into the space between the spirally wound flat filter elements 60. Furthermore, FIG. 6d shows a permeate line 30 with ducts (8, 8') and ducts (9, 9') for concentrate fluid.

LIST OF REFERENCE NUMBERS 1 refers to a filtration system;
10, 10' refers to a filter module;
3, 3' refers to an end wall of the filter modules;
4 refers to a housing of the filter module;
11, 13 refers to housing flanges;
7, 7' refers to a duct in the end wall for untreated fluid;
8, 8' refers to a duct in the end wall for permeate fluid;
9, 9' refers to a duct in the end wall for concentrate fluid;
30 refers to a permeate line;
40 refers to an untreated fluid line, distributor pipe;
41 refers to an outlet openings in the untreated fluid line;
60 refers to a filter element;
65,66,67,68 refer to edge regions of the filter elements;
70,70a,70b,70c refer to a fluid coupling;
71a,71b,71c,71d,71e refer to coupling bodies;
72 refers to a duct in the fluid coupling for untreated fluid;
73 refers to a duct in the fluid coupling for permeate fluid;
74 refers to a duct in the fluid coupling for concentrate fluid;
75 refers to a seal for untreated fluid;
76 refers to a seal for permeate fluid;
77 refers to a seal for concentrate fluid;
78 refers to a permeate reservoir;
79 refers to a concentrate reservoir;
200 refers to an untreated fluid;
210 refers to a concentrate fluid, and
220 refers to a permeate fluid.

The invention claimed is:

1. A filtration system, comprising
one or more filter modules and
one or more fluid couplings for coupling the filter modules to (i) a fluid distributor or (ii) further filter modules,
wherein the filter modules are configured as wound filter modules comprising one or more filter elements having edge regions in which, in each case, two or three of the edge regions are sealed in a fluidtight manner, with two of the edge regions sealed in a fluidtight manner running substantially in an axial direction between two end sides of the filter module, each filter element comprising two filter membranes and a drainage layer located in-between, with single or double permeate outlets formed from openings in a remaining filter element edge(s) at the filter module end side(s), with said openings providing fluid communication between the drainage layer and the fluid coupling(s);
the filter modules comprise one or two end walls, with at least one end wall having permeate outlet openings and one or more ducts for concentrate fluid;
the fluid couplings have at least one duct for permeate fluid, the duct for permeate fluid is connected to the permeate outlet openings and
the fluid coupling has at least one duct for concentrate fluid isolated in a fluidtight manner from the duct for permeate fluid.

2. The filtration system as claimed in claim 1, wherein the fluid coupling has at least one duct for untreated fluid isolated in a fluidtight manner from the duct for permeate fluid.

3. The filtration system as claimed in claim 1, wherein the fluid coupling comprises a coupling body of single-piece, two-piece or three-piece design.

4. The filtration system as claimed in claim 1, wherein the fluid coupling comprises a single-piece coupling body having at least one permeate reservoir, the permeate reservoir being connected to the duct for permeate fluid and to the permeate outlet openings of the filter modules.

5. The filtration system as claimed in claim 4, wherein an end wall is provided with one or more ducts for concentrate fluid and the single-piece fluid coupling comprises at least one concentrate reservoir in the form of an annularly encircling recess sealed via annular seals to said ducts for concentrate fluid in the end wall, and the concentrate reservoir is connected to the duct for concentrate fluid within said fluid coupling.

6. The filtration system as claimed in claim 1, wherein the fluid couplings comprise seals.

7. The filtration system as claimed in claim 1, wherein at least one end wall of the filter module has one or more ducts for permeate fluid.

8. The filtration system as claimed in claim 7, wherein at least one end wall of the filter module has one or more ducts for untreated fluid.

9. The filtration system as claimed in claim 1, wherein the filter modules comprise a housing.

10. The filtration system as claimed in claim 9, wherein the housing of the filter modules is of tubular configuration.

11. The filtration system as claimed in claim 1, wherein the filter modules comprise one or more untreated fluid lines, a wall of the untreated fluid lines having outlet openings.

12. The filtration system as claimed in claim 1, wherein the filter modules have an active filtration surface of greater than 50 m², and the flat filter elements comprise two filter membranes laminated to a drainage layer.

13. The filtration system as claimed in claim 12, wherein the filter modules have an active filtration surface of greater than 250 m².

14. The filtration system as claimed in claim 12, wherein the filter modules have an active filtration surface of greater than 1000 m².

15. The filtration system as claimed in claim 1, wherein the fluid coupling is a single-piece design and comprises (i) more than one permeate fluid duct and a distributor chamber in the form of an annularly encircling recess to connect the permeate fluid ducts and (ii) more than one concentrate fluid duct and a distributor chamber in the form of an annularly encircling recess to connect the concentrate fluid ducts.

16. The filtration system as claimed in claim 1, wherein said filter modules comprise at least one end wall having permeate outlet openings:
the fluid coupling comprises a single-piece coupling body having a first permeate reservoir in the form of an annularly encircling recess sealed via annular seals to the permeate outlet openings in the filter module end wall, with said first permeate reservoir connected to the duct for permeate fluid within said fluid coupling.

17. The filtration system as claimed in claim 1, wherein
the filter module is a wound filter module,
the fluid coupling further has at least one duct for untreated fluid isolated in a fluidtight manner from the duct for permeate fluid;
the filter modules comprise one or two end walls, with at least one end wall having permeate outlet openings,
at least one end wall of the filter module has one or more ducts for untreated fluid, and
at least one end wall of the filter module has one or more ducts for concentrate fluid.

18. The filtration system as claimed in claim 1, wherein the filtration system comprises filter modules having two end walls and one or more conduits for permeate fluid connecting the end walls.

* * * * *